United States Patent [19]

Miyata et al.

[11] Patent Number: 4,969,856
[45] Date of Patent: Nov. 13, 1990

[54] PULLEY TYPE SPEED-SHIFTING DEVICE

[75] Inventors: Hirofumi Miyata; Yutaka Furukawa, both of Kobe, Japan

[73] Assignee: Bando Chemical Industries, Ltd., Kobe, Japan

[21] Appl. No.: 481,050

[22] Filed: Feb. 16, 1990

[30] Foreign Application Priority Data

| Feb. 16, 1989 | [JP] | Japan | 1-17664 |
| Feb. 16, 1989 | [JP] | Japan | 1-17665 |
| Feb. 16, 1989 | [JP] | Japan | 1-17666 |
| Aug. 21, 1989 | [JP] | Japan | 1-215769 |
| Aug. 29, 1989 | [JP] | Japan | 1-100619 |

[51] Int. Cl.$^5$ ............................................. F16H 11/02
[52] U.S. Cl. ............................ 474/11; 474/19; 474/21
[58] Field of Search ............ 474/11, 12, 17, 19, 474/20, 21, 29, 30, 69, 70

[56] References Cited

U.S. PATENT DOCUMENTS

| 3,342,079 | 9/1967 | Yoshigaki et al. | 474/19 |
| 3,490,301 | 1/1970 | Steuer | 474/21 |
| 4,116,080 | 9/1978 | Berens | 474/21 |
| 4,196,641 | 4/1980 | Vogel | 474/19 |
| 4,380,444 | 4/1983 | Dolza | 474/21 |
| 4,400,930 | 8/1983 | Huhman et al. | 474/19 X |

Primary Examiner—Thuy M. Bui
Attorney, Agent, or Firm—Wenderoth, Lind & Ponack

[57] ABSTRACT

In a pulley type speed-shifting device with a belt trained between a pair of variable speed pulleys, a movable sheave of each pulley is driven by a cam mechanism. Each cam mechanism has a cylindrical cam arranged concentrically with a rotary shaft and a cam follower which is arranged concentrically with a rotary shaft and carries a rolling body which makes contact with the cam as it is rolling on a cam face. The movable sheave is driven in axial direction by either the cylindrical cam or the cam follower rotating around the rotary shaft and rotating relatively to the other. As the cam follower makes contact with the cam face through the medium of the rolling body, resistance is small and the transmission ratio can be shifted with light handling force.

13 Claims, 9 Drawing Sheets

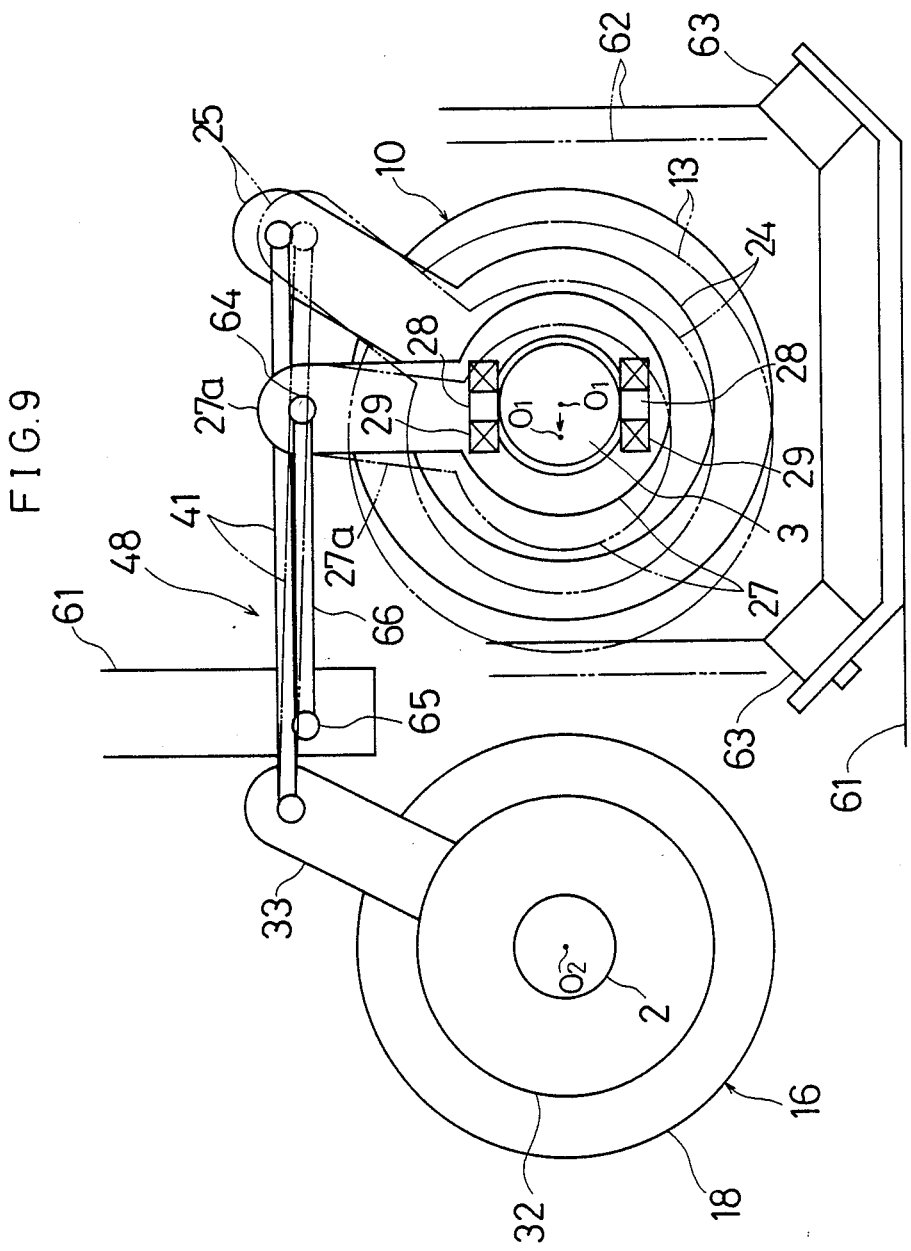

PULLEY TYPE SPEED-SHIFTING DEVICE

FIELD OF THE INVENTION

This invention relates to a pulley type speed-shifting device having a pair of variable speed pulleys and a belt of V-shape in cross section trained between both pulleys.

DESCRIPTION OF THE PRIOR ART

Conventionally, pulley type speed-shifting devices have been used widely for the power transmission system of comparatively lowe load, such as transmittions in agricultural implements, vehicles, etc. This speed-shifting device comprises, for example, a first and a second rotary shafts arranged in parallel with each other and a first and a second pulleys (a driving pulley and a driven pulley) which are variable speed pulleys, each fitted to said rotary shaft. Each pulley is composed of a fixed sheave fixedly rotatably and axially non-slidably mounted on the rotary shaft and a movable sheave axially slidably and fixedly rotatably mounted on the rotary shaft and forming a V-shaped belt groove with the fixed sheave and a belt is trained between said sheaves. The transmission ratio between the rotary shafts can be changed from a low speed mode to a high speed mode by varying the pulley diameter (effective radius of the belt groove) by moving each movable sheave axially toward and away from a fixed sheave facing thereto.

In a rice-planting machine which is one of agricultural implements, it is required to run the machine at a fixed speed to bed out young rice plants at a regular pitch. However, in the case where a pulley type speed-shifting device of such construction that movable sheaves are driven in axial direction by the force of spring is adopted for the rice-planting machine, variation of load on the machine is response to mud viscosity of the rice field causes such trouble that the belt bites into the belt groove, with resultant variation of transmission ratio. Thus, it is difficult to bed out young rice plants at a regular pitch by the rice-planting machine.

In order to keep the transmission ratio constant irrespective of the variation of load on the machine, it has been suggested to drive a movable sheave of the pulley by a cam mechanism and to give belt tension by a tension mechanism (tensioner).

However, in the construction of driving movable sheaves by cams, it is inevitable that the sliding resistance of cam is large and a handling force at speed-shifting becomes very large. Moreover, in case of emergency it is impossible to meet it quickly. Large resistance at the cam face causes earlier wear, with the result that precision of pulley positioning becomes worse and sliding resistance increases further. Therefore, it is essential to carry out the maintenance using lubricating oil to keep sliding resistance of the cam low.

The first object of the present invention is to improve the above cam mechanism, namely, to stabilize the sliding resistance of the cam to a low level, to prevent variations of transmission ratio due to variations of load by a cam mechanism and to check the increase of handling force.

In the case where such pulley type speed-shifting device is provided for the body of agricultural implements, etc., an engine is usually supported on the body through the medium of an elastic member, such as vibration-proof rubber, and a driving pulley is fitted to an output shaft of the engine which is one of the rotary shafts. The other rotary shaft is directly fixed and supported on the body side and a driven pulley is fitted to said rotary shaft. In this construction, transmission of vibration of the engine to the body is absorbed by the elastic member.

In that case, since the vibration systems at the engine side and the body side are different, vibration of the engine on the elastic member is transmitted to the cam mechanism of the driven pulley. In the construction where both pulleys are opened and closed by a cam mechanism, cam mechanism of both pulleys present a different movement by the vibration and both pulleys open and close, whereby the transmission ratio does not stabilize to a stationary state. As a result, a pulley sliding part wears earlier, calorific value increases due to shaking of the belt in radial direction and durability of belt lowers.

When tension of the tension side span of the belt changes due to variation of load, this tension change causes the change of compression deformation quantity of the elastic member, with resultant change in the axial distance between both rotary shafts. This change in axial distance itself is a little problem but since a link, for example, for operating both cam mechanism is supported on the body side, variation of the axial distance turns into movement by which the cam is rotated relatively to the cam follower. As a result, a belt pitch diameter of the driving pulley changes and the transmission ratio varies form a set value.

The second object of the present invention is to restrict wear of the pulley sliding part and to improve durability of the belt by preventing vibration of one cam mechanism from being transmitted to the other cam mechanism and thereby eliminating opening and closing of the pulley due to transmission of vibration, even if vibration systems at the first and the second pulleys are different.

The third object of the present invention is to improve the fixed construction of the cam follower in each of the above pulleys, namely, to keep stably the transmission ratio at a set value, irrespective of load variations of the speedshifting device, by rotating the cam follower in response to the rotation of the cam due to variations of the axial distance between both rotary shafts caused by load variation.

In the case where the axial distance between both pulleys of such pulley type speed-shifting device cannot be changed and tension is given to the belt by pushing the slack side span of the belt by a tension pulley urged by bias force of the spring or the like, if the engine brakes are applied with a throttle opening of the engine fully closed when an agricultural machine is running downhill, for example, the second pulley connected to the shaft and the first pulley on the engine side are changed over to the driving side and to the driven side respectively. Thus, power transmission relation is reversed. In accordance with this reversal, while the slack side span is changed over to the tension side, the tension side span is changed over to the slack side and the tension balance is changed. At this time, if vias force of an urging means is smaller than the belt tension of the original slack side span, the tension pulley is sprung up and the belt is put in a loosened state, with the result that transmitting ability is lost and the effect of engine cannot be obtained. The above problem can be solved by enlarging bias force of the urging means, but enlargement of the bias force applies more force than is necessary to the belt in a usual driving condition (at the time of non-engine brake) and causes shorter life of the belt. The same problem may also be solved by increasing the ability of a braking device but this method which involves enlargement of the braking device and cost increase is not necessarily a good solution.

The fourth object of the present invention is to ensure the transmitting ability of the speed-shifting device, namely, to prevent the tension pulley from being sprung up by the belt even when the power transmitting relation is reversed at the driving side and the driven side by providing the tension mechanism with a means of controlling its working.

A pulley type speed-shifting device, for example, has such construction that the pulley diameter of the second pulley is automatically adjusted in accordance with the positional change of the belt with the change of the pulley diameter of the first pulley, by changing the pulley diameter of the first pulley by moving the movable sheave of that pulley in axial direction by a cam mechanism and by urging the movable sheave of the second pulley toward the fixed sheave side by the spring.

In the above device, it raises the following problem to give bias force to the movable sheave of the second pulley by the spring, namely, the transmission ratio between both rotary shafts changes due to the fact that at the time of speed-shifting, the pulley diameter of the first pulley changes by the movement of the movable sheave and then the belt moves and the pulley diameter of the second pulley changes. Thus, it requires a certain period of time for shifting the speed. When the transmission ratio is shifted from a low speed mode to a high speed mode, the movable sheave is moved away from the fixed sheave against the bias force of the spring, for which a large handling force is required.

Accordingly, it is difficult to shift the transmission ratio between both rotary shafts quickly and smoothly by a small handling force.

The fifth object of the present invention is to make it possible to carry out the speed shifting smoothly with a small handling force, namely, to device a means of moving movable sheaves in the first and the second pulleys in concert with each other and to ensure the tension of the belt giving thrust by the construction other than urging of the movable sheave toward the fixed sheave side.

SUMMARY OF THE INVENTION

In order to attain the first object, a part which makes contact with the cam face of a cam is composed by a rolling member, such as a roller, so as to reduce sliding resistance.

The present invention is provided with a first and a second rotary shafts arranged in parallel with each other, a first and a second pulleys which are variable speed pulleys, each having a fixed sheave fixedly rotatably and axially non-slidably mounted on the rotary shaft and a movable sheave axially slidably and fixedly rotatably mounted on the rotary shaft and forming a V-shaped belt groove with the fixed sheave, a belt trained between said belt grooves, a first and a second cam mechanisms for changing the pulley diameter by moving the movable sheave of each pulley toward and away form the fixed sheave, and a speed shifting mechanism for changing the transmission ratio between both rotary shafts by interlocking both cam mechanisms.

Each of the above cam mechanisms has a cylindrical cam and a cam follower carrying a rolling body which makes contact with the cam face as it is rolling. Either the cylindrical cam or the cam follower is made rotatable around the rotary shaft so that the movable sheave is moved in axial direction by relative rotation of the cylindrical cam and the cam follower.

In order to reduce the loss of handling force, the above-mentioned speed shifting mechanism is equipped with a link of rod-shape which connects the cam mechanisms of both pulleys.

In order to attain the second object, a buffer means to absorb vibration transmitted between both cam mechanisms is provided for the speed shifting mechanism which makes the transmission ratio between both rotary shafts variable by interlocking both cam mechanisms so that the pulley diameters of both pulleys change in opposite directions each other.

As preferable examples of the above-mentioned speed shifting mechanism and buffer means, the speed shifting mechanism is composed of a link of rod-shape connected to the cam of one cam mechanism and a ball joint connected to the cam of the other cam mechanism and supported slidably on said link and the buffer means is composed of a spring which is arranged between the ball joint and the link so as to limit the relative movement of both.

In order to attain the third object, the cam follower is made to rotate in concert with the rotation of the cam due to the variation of axial distance by fixing the cam follower in each pulley on the body side.

Concretely, the first rotary shaft is made a rotary shaft of the power source for the engine, for example, supported elastically on a fixed body, such as the car body, through the medium of an elastic member and the second rotary shaft is supported rotatably on a fixed body. Disposed between both pulleys is a tension mechanism which gives tension to the belt by pressing the slack side span of the belt by a tension pulley when power of the first pulley is transmitted to the second pulley. Also, while the cam follower of the second cam mechanism is fixed to the fixed body, the cam follower of the first cam anism is connected and fixed to the fixed body so that the cam and the cam follower may not rotate relatively when the power source rotates around the rotary shaft due to deformation of the elastic member.

In order to attain the fourth object, a tension mechanism which gives tension to the belt is provided between both pulleys. This tension mechanism gives tension to the belt by pressing the belt slack side span by the tension pulley when power of the first pulley is transmitted to the second pulley. In addition, a controlling means which prevents the tension pulley from being displaced more than specified in the direction opposite to the primary direction.

Concretely, it is preferable to compose the above-mentioned tension mechanism and controlling means as follows. The tension mechanism has a tension arm supporting the tension pulley and an urging means arranged between said arm and a fixed body for urging the tension arm so as to let the tension pulley press the belt. The controlling means is composed of a checking member which is fixed to the fixed member and prevents the tension arm from rotating more than specified in the direction opposite to the direction in which the tension pulley presses the belt. The controlling means can also be composed of a link mechanism or a flexible mechanism, such as wire, arranged between the tension arm and the fixed body in parallel with the above urging means. When the tension arm rotates more than specified in the direction opposite to the direction in which the tension pulley presses the belt, the flexible mechanism tenses and the tension arm is prevented from rotating further.

The controlling means can also be composed of a damper member arranged between the tension arm and the fixed body in parallel with the above urging means. When the tension arm rotates in the direction opposite to the direction in which the tension pulley presses the belt, expansion and contraction resistance of the damper member increases and the tension arm is prevented form rotating more than specified.

In order to attain the fifth object, the first and the second cam mechanisms have the function of positioning the movable sheave in relation to the fixed sheave in each pulley. In order to obtain the belt thrust, the slack side of the belt trained between both pulleys is pressed by higher tension.

Concretely, according to the present invention a thrust generating mechanism is arranged between the first and the second pulleys. This mechanism generates belt thrust by pressing the slack side span of the belt trained between both pulleys by tension which is larger than the tension generated at said slack side span in accordance with the transmission ratio.

Tension T (Kgf) to be generated at the slack side span is expressed by the following formula.

$$T = (75L/V) \times \{(e^{\mu'\theta} - 1)\} + (N.w.V^2/g) \quad (1)$$

where
(PS)=load
V(m/s)=belt speed
e=bottom of natural logarithm
$\mu'$=the coefficient of friction of belt
$\theta$(rad)=contact angle of small pulley with belt
N=number of belts
w(Kg/m)=unit weight of belt
g(m/s$^2$)=the acceleration of gravity Concretely, the above thrust generating mechanism is so composed as to press the slack side span of the belt by the maximum tension to be generated at said slack side span.

The above thrust generating mechanism is also composed so as to press the slack side span of the belt by the tension which varies in accordance with the transmission ratio between rotary shafts.

Furthermore, the thrust generating mechanism is so composed as to have a roller which can press the slack side span of the belt, a roller supporting member to support said roller rotatably and an urging member to urge said roller supporting member to let the roller press the belt. The above roller supporting member is provided movably so as to lower the tension of the belt and to function as a clutch mechanism whereby power transmission between both rotary shafts is intercepted by lowering of the belt tension.

BRIEF DESCRIPTION OF THE DRAWINGS

The nature and advantages of the present invention will be understood more clearly from the following description made with reference to the accompanying drawings, in which:

FIG. 9 shows the movement at the time of load variation and corresponds to FIG. 8.

DETAILED DESCRIPTION OF THE INVENTION

Figure 1:
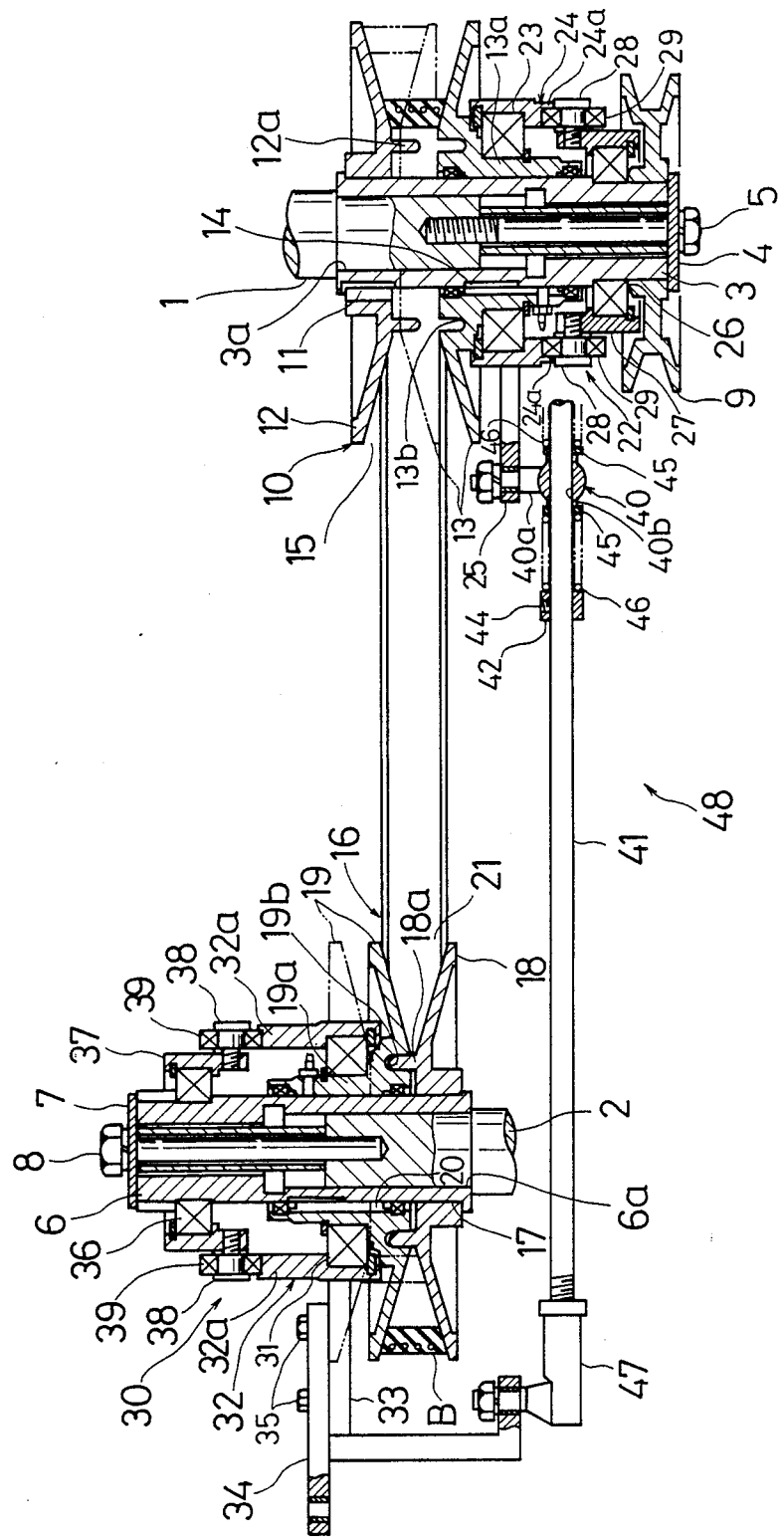
FIG. 1 is a cross section of a speed-shifting device of the first embodiment.
Figure 2:
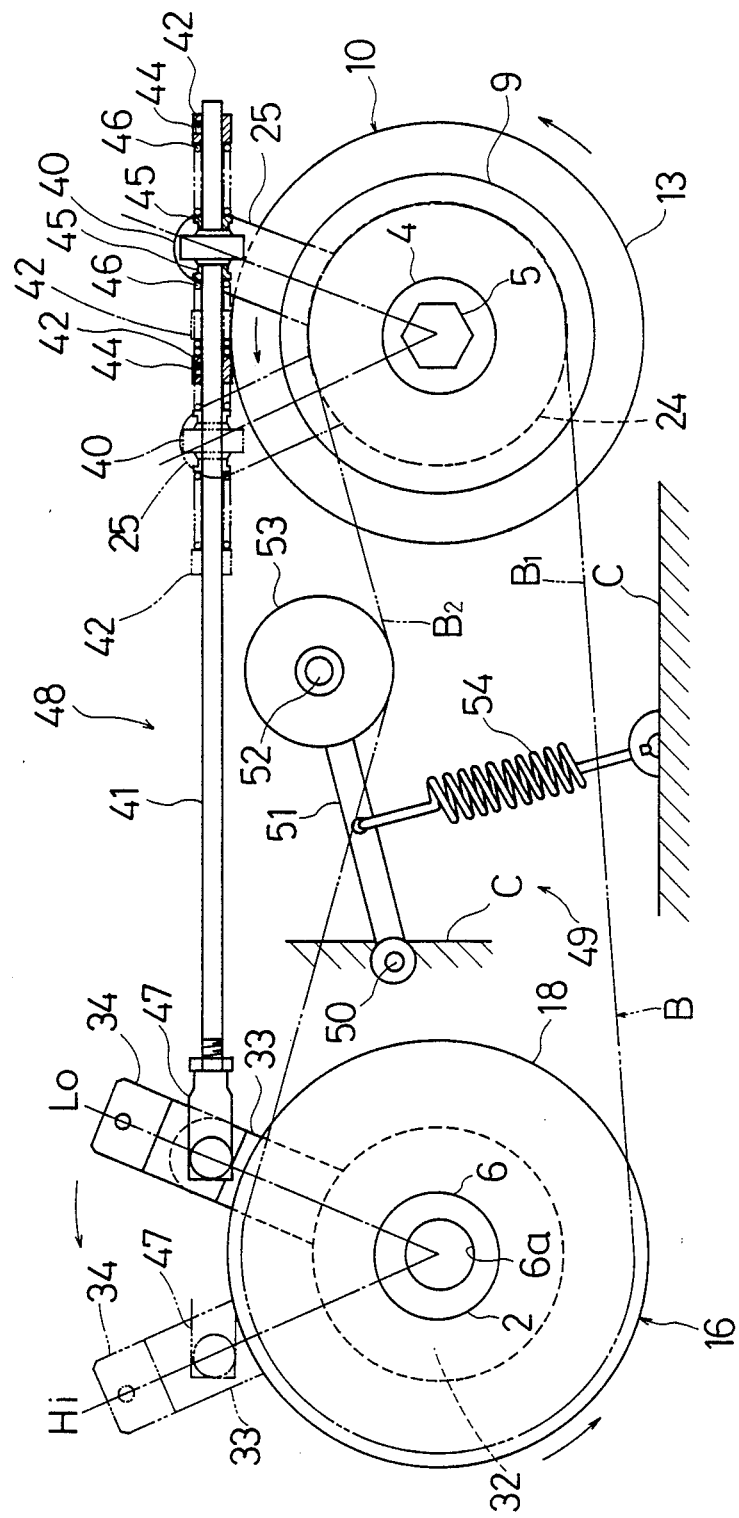
FIG. 2 is a front view of the speed-shifting device shown in FIG. 1.
Figure 3:
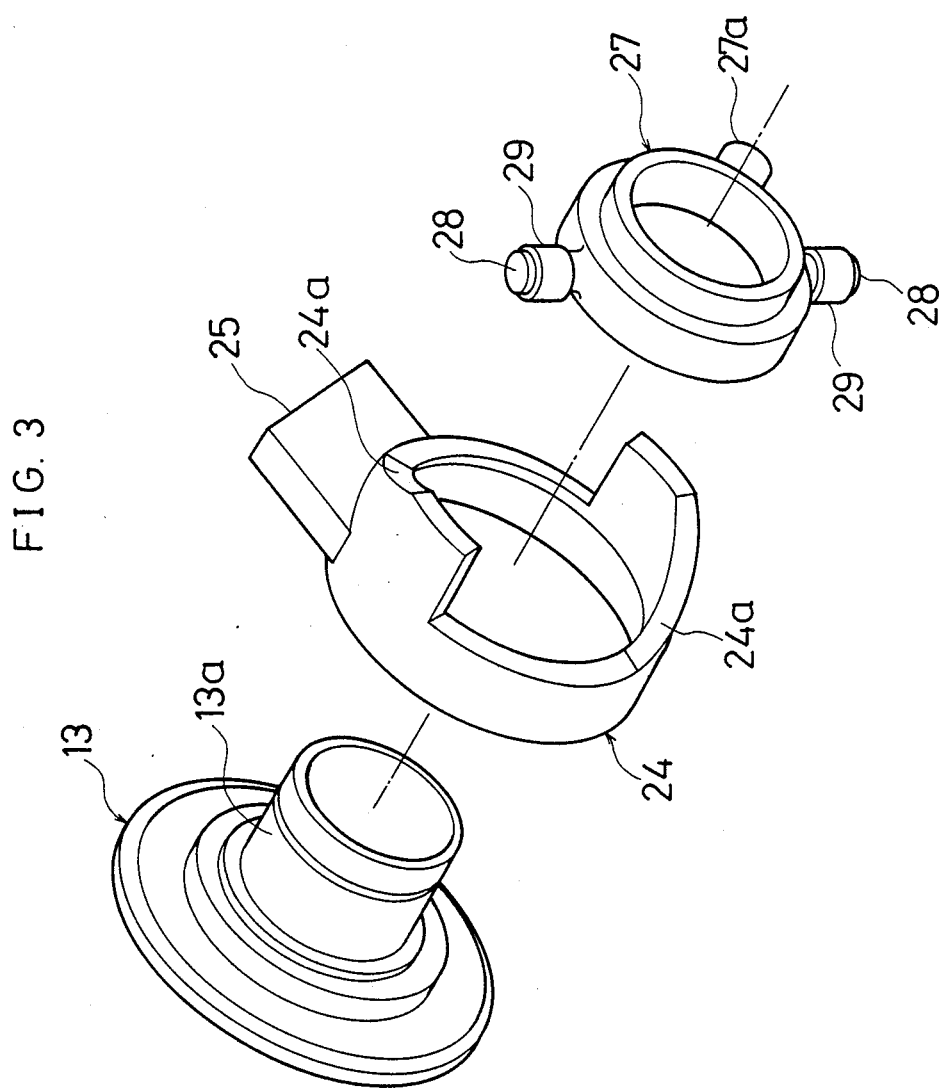
FIG. 3 is a perspective view of the cam mechanism, on an enlarged scale.

FIG. 1 to FIG. 3 show the first embodiment of the present invention applied to the speed-shifting device of a rice-planting machine. An input shaft i is supported rotatably by a bearing part (not shown in the drawing). The bearing part, together with an engine (not shown in the drawing), is mounted on the body of an agricultural machine through the medium of a vibration-proof rubber (not shown in the drawing). An output shaft 2 is supported rotatably by a bearing part (not shown in the drawing) fixed to the body and is connected to an axle (not shown in the drawing) of the rice-planting machine.

A first rotary shaft 3 is fitted rotatably to the input shaft 1. More particularly, the input shaft 1 is put through a center hole 3a of the first rotary shaft 3 from one end side (upper side in FIG. 1) of the shaft 3 and a binding bolt 5 put through a clasp 4 is inserted from the other end side of the shaft 3. By screwing the binding bolt 5 into an end portion of the input shaft 1, the first rotary shaft 3 is fixed to the input shaft 1.

A second rotary shaft 6 is fitted rotatably to the output shaft 2, similarly to the case of the first rotary shaft 3. More particularly, the output shaft 2 is inserted into a central hole 6a of the second rotary shaft 6 from one end side (lower side in FIG. 1) of the shaft 6 and a binding bolt 8 put through a clasp 7 is screwed into and end portion of the output shaft 6, whereby the second rotary shaft 6 is fixed to the output shaft 2.

A V-pulley 9 is fixed rotatably to the other end (end portion opposite to the input shaft 1) of the first rotary shaft 3. This V-pulley 9 is connected to the engine through the medium of a V belt (not shown in the drawing) and both the input shaft 1 and the first rotary shaft 3 are driven by the engine. A first pulley 10 comprising a variable speed pulley is supported on one end of the first rotary shaft 3. This first pulley 10 comprises a fixed sheave 12 rotatably and non-slidably fixed to the first rotary shaft 3 by the means of a key 11 and a movable sheave 13 rotatably and slidably fixed to the first rotary shaft 3 by means of a key 14, facing said fixed sheave 12. A belt groove 15 of V-shape in cross section is formed between both sheaves 12, 13.

A second pulley 16 comprising a variable speed pulley is supported on the second rotary shaft 6. This second pulley 16 is similar in construction to the first pulley 10 and comprises a fixed sheave 18 rotatably and non-slidably fixed to the second rotary shaft 6 by means of a key 17 and a movable sheave 19 rotatably and slidably fixed to the second rotary shaft 6 by means of a key 20 in such a fashion that it faces the fixed sheave 18 in the direction opposite to the direction in which the movable sheave 13 faces the fixed sheave 12 in the first pulley 10. A belt groove 21 is formed between both sheaves 18, 19. A V-belt B is trained between the belt grooves 15, 21.

The pulley diameter (effective radius to the belt B) of each pulley 16 is varied by moving of each movable sheave 13, 19 of the first and the second pulleys 10, 16 toward and away from each fixed sheave 12, 18. For example, when the movable sheave 13 of the first pulley moves toward the fixed sheave 12 and the movable sheave 19 of the second pulley 16 moves away from the fixed sheave 18, the pulley diameter of the first pulley 10 becomes larger than that of the second pulley 16 and the rotation of the first rotary shaft 3 is transmitted to the second rotary shaft 6 at an increased speed. On the other hand, when the movable sheave 13 moves away from the fixed sheave 12 and the movable sheave 19 moves toward the fixed sheave 18, the pulley diameter of the first pulley 10 becomes larger than that of the second pulley 16 and the rotation of the first rotary shaft is transmitted to the second rotary shaft 6 at a reduced speed.

A first cam mechanism 22 which moves the movable sheave 13 of the first pulley 10 toward and away from the fixed sheave 12 is provided for the first rotary shaft. As shown in FIG. 3, on an enlarged scale, this cam mechanism has a cylindrical cam 24 which is relatively rotatably and axially movably mounted on a boss part 13a of the movable sheave 13 through the medium of a bearing 23. A pair of inclined cam faces 24a are formed, with an equal angle space (180° space) left therebetween, in circumferential direction at an end face on the side opposite to the first pulley 10 of the cam 24. A rotating lever 25 is provided protrudingly at the outer periphery of the cam 24. A cam follower 27 is supported relatively rotatably, through the medium of a bearing 26, on the outer periphery of the other end of the first rotary shaft 3. A flange 27a is provided protrudingly at the outer periphery of the cam follower 27. This flange is connected to a case C, for example, of the speed-shifting device and therefor the cam follower 27 is fixed non-rotatably rotatably to the case C. Two pins 28 extending in radial direction are fitted to the outer periphery of the cam follower 27. A roller 29 which rolls in contact with each cam face 24a of the cam 24 is supported rotatably on each pin 28.

A second cam mechanism 30 which moves the movable sheave 19 of the second pulley 16 toward and away from the fixed sheave 18 is provided for the second rotary shaft 6. This second cam mechanism 30 is similar in construction to the first cam mechanism 22 (refer to FIG. 3). This cam mechanism 30 has a cylindrical cam 32 which is rotatably and non-slidably supported on the boss part 19a of the movable sheave 19 through the medium of a bearing 31. A pair of inclined cam faces 32a are formed at the end face on the side opposite to the first pulley 16 of the cam 32. A rotating lever 33 is fitted to the outer periphery of the cam 32. An operating lever fitting member 34 is fitted to a forward end of the rotating lever 33 by means of bolts 35. A forward end of the fitting member 34 is connected to an operating lever (not shown in the drawing). A cam follower 37 is supported at the outer periphery of the other end of the second rotary shaft 6 through the medium of a bearing 36. The cam follower 37 is fixed to the case C and is non-rotatable. A pair of pins 38 are fitted to the outer periphery of the cam follower 37, with an equal space left therebetween in circumferential direction. A roller 39 which makes contact with each cam face 32a of the cam 32 is supported rotatably to each pin 38.

A ball joint 40 with an axis part 40a in parallel with the first rotary shaft 3 is supported rotatably to a forward end of the rotating lever 25. This ball joint 40 has a link passing through a hole 40b, through which an end of a link 41 comprising a straight rod is passed slidably. A pair of spring stoppers 42 of ring shape are fixed non-movably by driving of screws 44 to the link on both sides of the ball joint 40. Spring weights 45 of ring-shape are supported on the link 41 on both sides of the ball joint 40. A spring 46 is interposed between each spring weight 45 and the corresponding spring stopper 42 as a buffer means. By these springs 46, the ball joint 40 is balanced to the center position between both spring stoppers 42.

The link 41 extends toward the second rotary shaft 6 and the other end thereof is connected rotatably to the fitting member 34 through the medium of a link ball 47. Thus, a speed shifting mechanism 48 which shifts the transmission ratio between both rotary shafts 3, 6 is composed by the ball joint 40, the link 41, springs 46 and the operating lever. When the operating lever of the speed shifting mechanism 48 is operated for shifting, cams 24, 32 of each cam mechanism 22, 30 rotate in linkage and rollers 29, 39 roll on the cam faces 24a, 32a. By the movement of the cam mechanisms 22, 30, the movable sheaves 13, 19 move toward and away from the fixed sheaves 12, 18 and effective radius of the belt grooves 15, 21 (pulley diameters of the pulleys 10, 16) varies and the transmission ratio between rotary shafts 3, 6 is shifted.

As shown in FIG. 2, a thrust generating mechanism 49 which generates thrust by giving tension to the belt B is disposed between the first and the second pulleys 10, 16. According to this thrust generating mechanism 49, belt thrust is generated by that when the driving force of the first pulley 10 is transmitted to the second pulley 16, it presses the span $B_2$ of the belt B which becomes a slack side from the back. More particularly, the thrust generating mechanism 49 comprises an arm 51 supported swingably to the case C by an axis 50, a roller 53 supported rotatably to a forward end of said arm 51 by an axis 52, and a spring 54 which is disposed between the intermediate part of the arm 51 and the case C and which urges the arm 51 to rotate clockwise in FIG. 2 so as to let the roller 53 press the back of the slack side span $B_2$. Bias force of the spring 54 is so set that the roller 53 presses the slack side span $B_2$ by the tension which is larger than the maximum tension to be generated at the span $B_2$ and by this tension the belt thrust is generated.

In the construction where tension is generated at the slack side span $B_2$ by rotation of the arm 51 as mentioned above, if the back angle at which the slack side span $B_2$ is bent by the roller 53 is the direction opposite to the usual direction is $a$(rad), tension load F (Kgf) which can hold the maximum tension T (refer to the formula (1)) to be generated at the slack side span $B_2$ is expressed by the following formula.

$$F = 2T \cdot \cos(a/2) \qquad (2)$$

In the construction where the roller 53 is supported at a forward end of the arm 51, when the direction in which the roller 53 presses the span $B_2$ deviates by angle β(rad) from the direction in which said tension load acts, the tension load is corrected by the following formula (3).

$$F' = F \cdot \cos\beta \qquad (3)$$

The length of the roller 53 in axial direction should be made long so that it keeps contact with the back of the belt B which moves in axial direction.

Ring parts 12a, 18a which extend concentrically with rotary shafts 3, 6 are provided protrudingly toward the movable sheaves 13, 19 at the inner circumferential parts corresponding to the bottom parts of the belt grooves 15, 21 at the opposed surfaces of the fixed sheaves 12, 18 and the movable sheaves 13, 19. Annular grooves 13b, 19b are formed at the opposed surfaces of the movable sheaves 13, 19 and the fixed sheaves 12, 18. When the movable sheaves 13, 19 approach the fixed sheaves 12, 18, the ring parts 12a, 18a ere received in the annular grooves 13b, 19b.

A description is made below about the operation of the embodiment.

When a rice-planting machine is run by transmitting power of engine to axles, a clutch is in ON state. In this state, the arm 51 is urged in clockwise direction in FIG. 2 by bias force of the spring 54 and the roller 53 at a forward end of the arm 51 presses the back of the slack side span B$_2$ of the belt B and by this pressing tension is given to the span B$_1$. Since this tension is larger than the maximum tension to be generated at the slack side span B$_2$, wedging effect on the pulleys 10, 16 of the belt B is produced and thrust is generated. By this thrust, power is transmitted form the first pulley 10 to the second pulley 16 through the medium of the belt B.

In the low speed state where the output rotation of the engine is decelerated and transmitted to the axle, for example, the operating lever of the transmission shifting mechanism 48 is located in the low speed position (Lo). As this operating lever is connected to the rotating lever 33 through the medium of the fitting member 34, the ca 32 rotates in one direction around the boss part 19a of the movable sheave 19 as it is rolling each roller 39 on the cam face 32a. By this movement, the cam face 32a is pressed by the roller 39 and accordingly the cam 32 and the movable sheave 19 connected to the cam 32 through the medium of the bearing 31 move downwardly in FIG. 2. By the moving of the movable sheave 19 toward the fixed sheave 18, the second pulley 16 closes and the pulley diameter increases. By the increase of the pulley diameter, the belt B is drawn toward the second pulley 16.

As the rotating lever 25 is connected to the fitting member 34 through the medium of the link 41 and the ball joint 40 with the switchover of the operating lever to the low speed position (Lo), the cam 24 rotates in the same direction as the cam 32, synchronously with the movement of the movable sheave 19 of the second pulley 16. By this rotation of the cam 24, pressing on the roller 29 ceases. Therefore, by the tension of the belt B moving toward the second pulley 16, the cam 24 and the movable sheave 13 connected to the cam 24 through the medium of the bearing 23 move in the direction away from the fixed sheave 12 (downwardly direction in the drawing) and by the separation of both pulleys 12, 13 from each other, the first pulley 10 opens and the pulley diameter decreases. Accordingly the pulley diameter of the first pulley 10 becomes smaller than that of the second pulley 16 and the rotation of the first rotary shaft 3 is decelerated and transmitted to the second rotary shaft 6.

Contrary to the above, in the high speed state where rotation of the engine is accelerated and transmitted to the axle, the operating lever is located in the high speed position (Hi). With the operation of switchover, the cam 24 rotates in the other direction as it is rolling the roller 29 on the cam face 24a. By this rotation of the cam 24, the cam face 24a is pressed by the roller 29 and moves upwardly in FIG. 2 and the movable sheave 13 also moves in the same direction toward the fixed sheave 12. By this movement, the first pulley 10 closes and the pulley diameter increases. By this increase in the pulley diameter, the belt B is drawn toward the first pulley 10.

In synchronism with the movement of the movable sheave 13, the cam 32 rotates in the same direction as the cam 24. By this rotation of the cam 32, pressing on the roller 39 ceases and the movable sheave 19, along with the cam 32, moves in the direction away from the fixed sheave 18 (upwardly in the drawing) by the tension of the belt B. By the separation of both sheaves 18, 19 from each other, the second pulley 16 opens and the pulley diameter decreases. As a result, the pulley diameter of the first pulley 10 becomes larger than that of the second pulley 16 and the rotation of the first rotary shaft 3 is accelerated and transmitted to the second rotary shaft 6.

In this embodiment, since the movable sheaves 13, 19 are driven by cylindrical cams 24, 32 of the first and the second cam mechanisms, opening and closing state of each pulley 10, 16 can be maintained firmly and therefore it is possible to keep the transmission ratio of the speed-shifting device constant, even if load variation occurs at the axle. Thus, running speed of the rice-planting machine can be kept constant, irrespective of the variation of load on the machine due to mud viscosity in the rice field.

The contact of the cams 24, 32 with the cam followers 27, 37 is a rolling contact by means of the rollers 29, 39. As compared with the construction where the cam face makes direct contact with the cam follower, the above construction involves very small sliding resistance. Accordingly, shift operating force required at speed shifting can be lightened and in case of emergency, transmission ratio can be shifted quickly to the safety side, for example. The present inventors carried out a comparative test of operating force with a rice-planting machine of 7-horsepower type equipped with the speed-shifting device of this embodiment and a conventional machine (roller is not fitted to the cam follower). The test result shows that while the conventional machine required shift operating force of 20–14 Kgf, the present invention required only 7–5 Kgf, less than half of the case of conventional machine.

According to the present invention, since the degree of wear of the cam face 24a, 32a is small, precision of the opening and closing state of the pulley 10, 16 is improved and the shift operating force can be kept small for a long period of time. In addition, maintenance using lubricating oil can be dispensed with. As both cam mechanisms 22, 30 are connected with each other at high rigidity by the link 41 comprising a straight rod, operating force of the operating lever is transmitted to the cam mechanisms 22, 30 without loss.

At the time of speed shifting, transiently the link 41 and the ball joint 40 move relatively by contracting one spring 46 and expanding the other spring 46. However, when both are put in a stationary state, both springs 46 return to their original length and the ball joint 40 is held in the specified position by the balancing of the springs 46, whereby the transmission ratio between the first and the second rotary shafts 3, 6 is maintained constant. In this stationary state, while the first pulley 10 is held on the engine side, the second pulley 16 is held on the body side. As the vibration systems of both are different, vibration on the engine side, for example, will be transmitted to the second cam mechanism 30 of the second pulley 16 on the body side through the link 41 and the ball joint 40. However, when the link 41 moves relatively to the ball joint 40, this movement is damped by expanding and contracting of he springs 46. Therefore, the working state of the second cam mechanism 30 varies due to transmittion of engine vibration and the movable sheave 19 of the second pulley 16 does not move, with the result that unstable opening and closing of the second pulley 16 is eliminated and the transmission ratio can be stabilized to the stationary state. Accordingly, wear of the sliding part between the movable sheave 19 and the second rotary shaft 6 at an early stage can be prevented. In addition, movement of the belt B in diametrical direction with opening and closing of the pulley 16 is eliminated and generation of heat of the belt B is checked, with resultant improvement of its durability.

As the link 41 is a straight rod, a small space is required for arrangement of the speed shifting mechanism 48 and the layout of it is made easy. Thus, facilitation of arrangement layout of the speed shifting mechanism 48 and restriction of vibration transmission can be reconciled.

By the face that tension is given to the belt B by the back of the slack span $B_1$ being pressed by the roller 53, belt thrust is generated by this tension and the movable sheaves 13, 19 of both pulleys 10, 16 are moved in axial direction by the mechanical driving of the speed-shifting device 48, opening and closing forces between both pulleys 10, 16 are reversed. The opening and closing forces between both pulleys 10, 16 offset each other partially and the rest becomes operating force. Therefore, large operating force required for moving the movable sheave against bias force of the spring at the time of speed shifting, as in the case of conventional construction where the movable sheave of the second pulley is urged toward the fixed sheave side by the spring, can be dispensed with. Moreover, since the movable sheaves 13, 19 move synchronously, speed at which the speed is shifted is made faster and therefore, speed shifting operation between the first and the second rotary shafts 3, 6 can be done smoothly by a small operating force. In this connection, the experiment made by the present inventors has revealed that in the case where belt thrust as obtained by the spring for transmitting power of 7-horsepower between the first and the second rotary shafts 3, 6, for example, about 100 Kgf was required in the conventional construction but only about 10 Kgf was required in the present invention, reduction to about 1/10.

As the arm 51 is urged by the spring 54 to rotate so that &he tension of the slack side span $B_2$ becomes larger than the maximum tension, it is possible to generate belt thrust by a simple construction.

In order to stop running of a rice-planting machine, if transmission of power of the engine to the axle is intercepted and the clutch is made OFF, the arm 51 will be rotated counterclockwise in FIG. 2 against bias force of the spring 54, whereby pressing of the pulley 53 on the slack side span $B_1$ is stopped. By this stoppage, tension of the belt B lowers and belt thrust ceases to exist, with the result that power transmission from the first pulley 10 to the second pulley 16 is stopped.

As the clutch is shifted to ON/OFF only by rotating the arm 51, interception of power transmission and release of it can be carried out, irrespective of the transmission ratio. Therefore, interception of power transmission can be carried out instantly. Also, the transmission ratio at the resumption of power transmission can be kept the same as that before the interception of power transmission and therefore, as compared with the clutch mechanism where the power transmission is intercepted with the movable sheave of the first or the second pulley 16 separated from the fixed sheave to the largest extent, after stopping of the operation of the clutch mechanism the transmission ratio can be returned quickly to the original transmission ratio.

In the above embodiment, bias force of the spring 54 is made constant but can be varied and adjusted according to the transmission ratio by utilization of a cylinder or the like. In this case, as the tension of the slack side span $B_2$ varies with the transmission ratio, it is sufficient to give the minimum tension required to the slack side span $B_2$. This will result in prolonging the usable life of the belt. It is also suggested to press the interior side of the slack side span $B_2$ for the same purpose.

In the above embodiment, movable sheaves 13, 19 are moved in axial direction by the cam mechanism 22, 30 but other mechanisms can be adopted for the same purpose, for example, movable sheaves 13, 19 are moved by screw members which are worked by relative rotation of the axes 3, 6.

Figure 4:
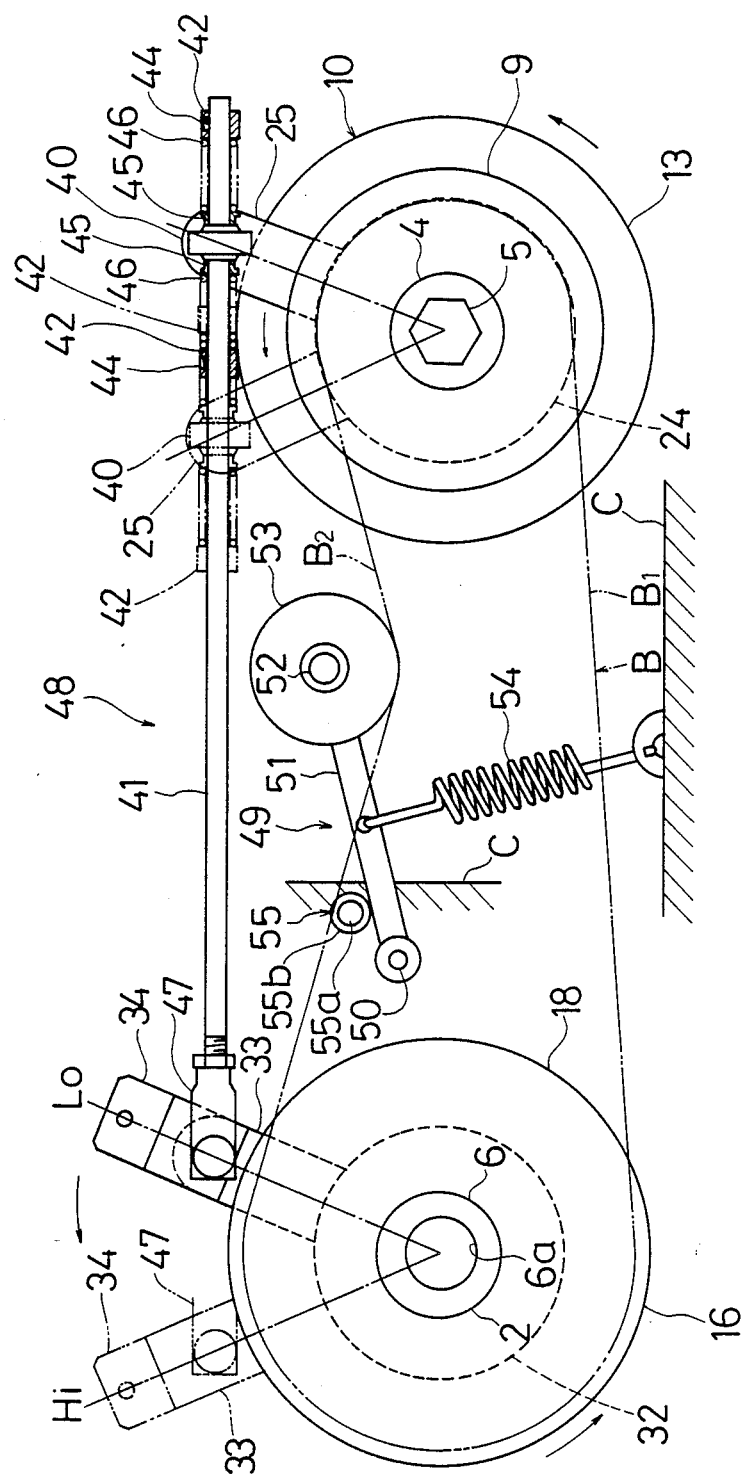
FIG. 4 is a front view of the speed-shifting device of the second embodiment.

FIG. 4 shows the second embodiment. Parts which are the same as those in FIG. 2 are given the same reference numbers and detailed explanations of them are omitted.

In this embodiment, a checking member 55 which is connectable with the arm 51 is fixed to the case C. This checking member 55 comprises a pin 55a and a cylindrical rubber 55b covering said pin 55a. When the arm rotates more than specified in the direction opposite to the direction in which the roller 53 presses the back of the slack side span $B_2$ (counterclockwise direction in the drawing), the checking member 55 makes contact with the intermediate part of the arm 51 and checks the rotation of the arm 51, whereby the roller 53 is prevented from being moved in the direction opposite to the direction in which the belt is pressed.

In this embodiment, therefore, in the case where a running rice-planting machine approaches a downward slope, for example, and an axle lever is loosened to apply the engine brakes, the power transmission relation between the first and the second pulleys 10, 16 is reversed, whereby the second pulley 16 is changed to the driving side and the first pulley is changed to the driven side. In this state, as the tension of the slack side span $B_2$ of the belt B increases, the roller 53 is pushed back and the arm 51 rotates in direction opposite to the direction in which the roller 53 presses the belt (counterclockwise direction in the drawing) against bias force of the spring 54 When this rotating displacement exceeds the specified degree, the intermediate part of the arm 51 makes contact with the checking member 55 and the arm 51 is prevented from rotating further and slackening of the belt B ceases. Thus, transmitting ability between both pulleys 10, 16 is ensured and a rice-planting machine runs stably, even on a long downward slope, by effective working of engine brakes.

Since a part at which the checking member 55 makes direct contact with the arm 51 is the rubber 55b, no abnormal noise is produced. As the engine brakes work accurately, a brake gear of high capacity is not required. Therefore, miniaturization of the brake gear and cost reduction can be planned.

Figure 5:
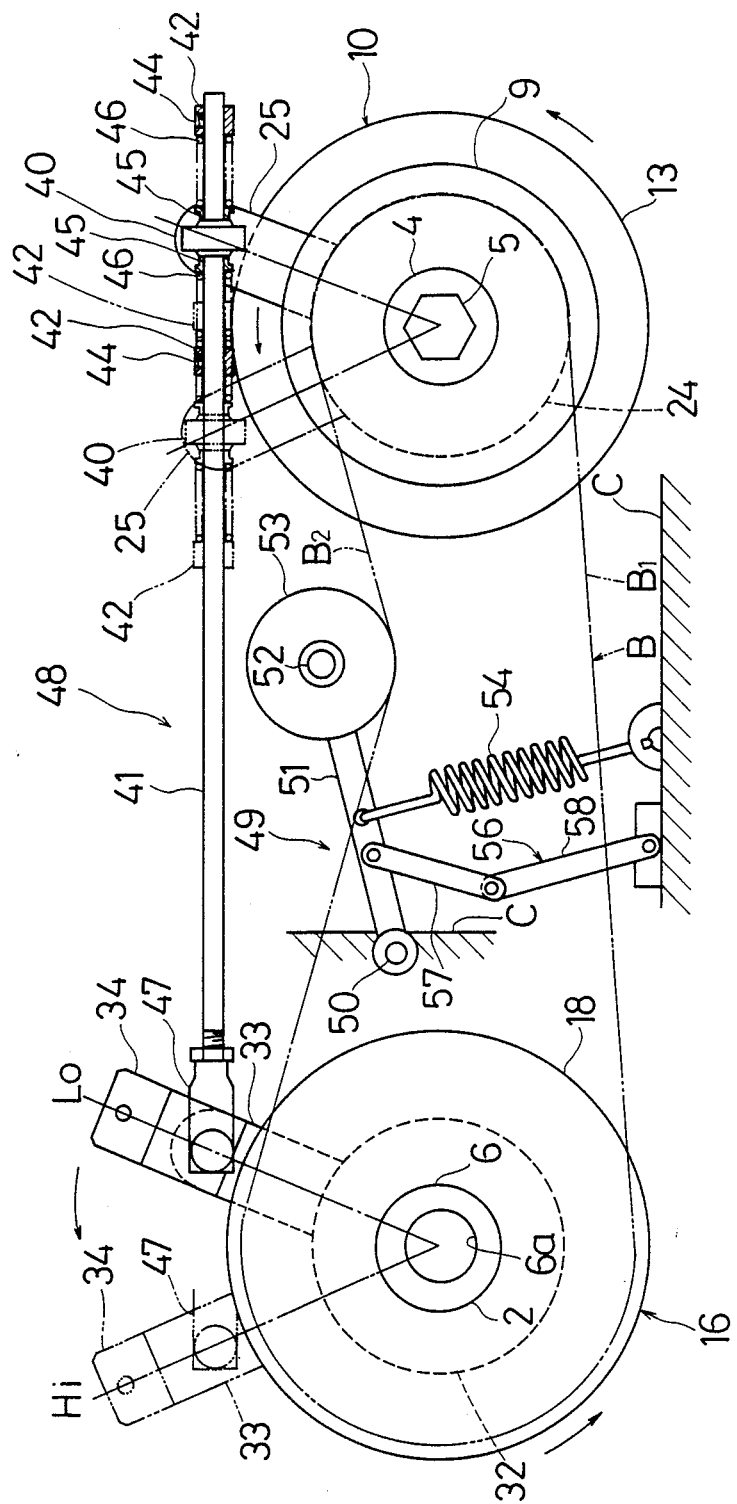
FIG. 5 is a front view of the speed-shifting device of the third embodiment.

FIG. 5 shows the third embodiment. In this embodiment, a link mechanism 56 (flexible mechanism) is arranged in parallel with the spring 54 between the intermediate part of the arm 51 and the case C. This link mechanism 56 comprises a first link 57 with one end thereof connected to the arm 51 by a pin and a second link 58 with one end thereof connected to the other end of the first link 57 by a pin and the other end thereof connected to the case C by a pin. When the arm 51 rotates more than specified in the direction opposite to the direction in which the roller 53 presses the belt, the link mechanism 56 is put in a state of tension where both links 57, 58 extend in a straight line and pulls the arm 51, preventing the arm 51 from rotating further.

In this embodiment, therefore, when the engine brakes work and the arm 51 rotates more than specified in the direction opposite to the direction in which the roller 53 presses the belt with the reversal of the power transmission relation between both pulleys 10, 16, the link mechanism 56 is pulled and stretches, thereby rotation of the arm 51 is restricted and the roller 53 is prevented from being sprung up. Thus, transmitting ability between both pulleys 10, 16 is ensured.

Figure 6:
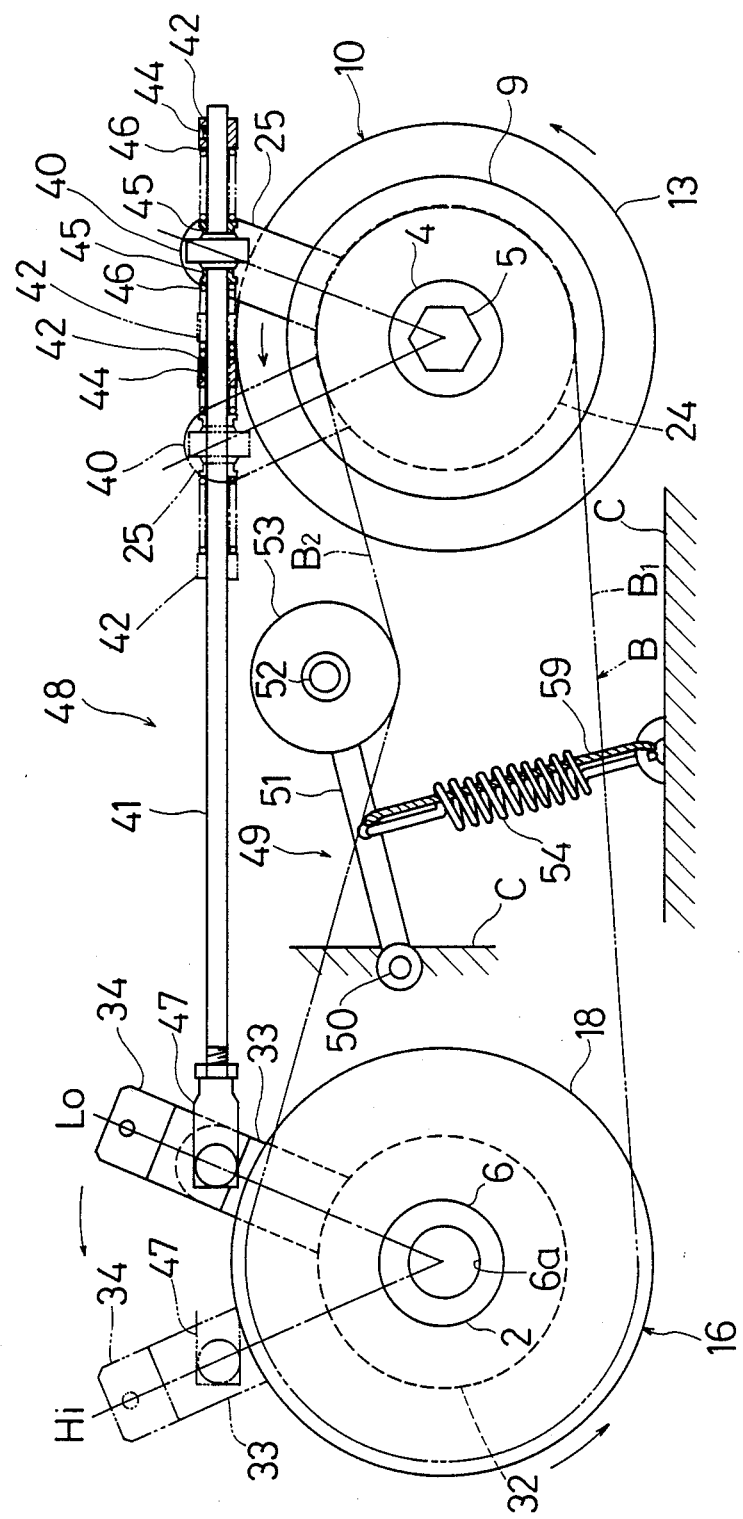
FIG. 6 shows a modified example of the flexible mechanism and corresponds to FIG. 5.

As shown in FIG. 6, a wire 59 can be used as a flexible mechanism, in place of the link mechanism.

Figure 7:
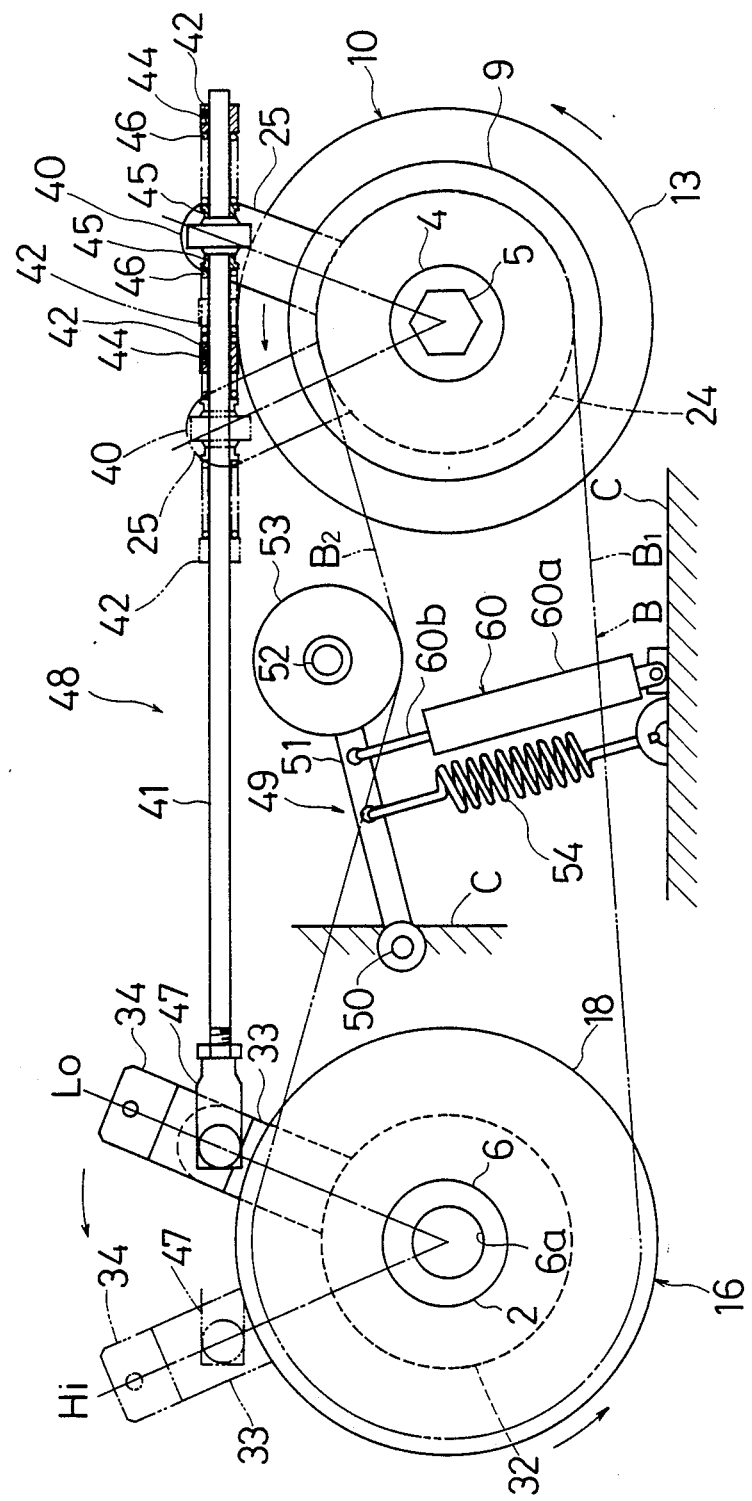
FIG. 7 is a front view of the speed-shifting device of the fourth embodiment.

FIG. 7 shows the fourth embodiment. In this embodiment, rotation of the arm 51 is restricted by a damper. A damper member 60 is arranged in parallel with the spring 54 between the intermediate part of the arm 51 and the case C. This damper member 60 has a cylinder 60a connected swingably to the case C by a pin and a piston rod 60b connected to the piston (not shown in the drawning) fitted slidably in said cylinder 60a, with a top end thereof connected swingably to the arm 51 by a pin. Inside of the cylinder 60a is partitioned into two rooms and a check valve to control circulation of the air between the two rooms is provided in the piston. Only when the piston slides in the direction in which the damper member 60 expands, the check valve opens and resistance is applied to the expanding movement of the damper member 60. Under this construction, when the arm 51 rotates in the direction in which the roller 53 presses the belt (clockwise direction in the drawing), the damper member 60 contracts smoothly. However, when the arm 51 rotates in the direction opposite to the direction in which the roller 53 presses the belt (counterclockwise direction in the drawing), resistance of the damper member 60 increases and by this resistance of the damper member 60, the arm 51 is prevented from rotating more than specified.

In this embodiment, therefore, when the arm 51 rotates in the direction in which the roller 53 presses the belt, there is no resistance of the damper member 60 and the ar 51 rotates smoothly by bias force of the spring 54. However, when the arm 51 rotates in the reverse direction due to reversal of the power transmission relation between both pulleys 10, 16, resistance of the damper member 60 increases and by this resistance, the arm 51 is prevented from rotating more than specified and the transmitting ability between both pulleys 10, 16 is ensured.

Figure 8:
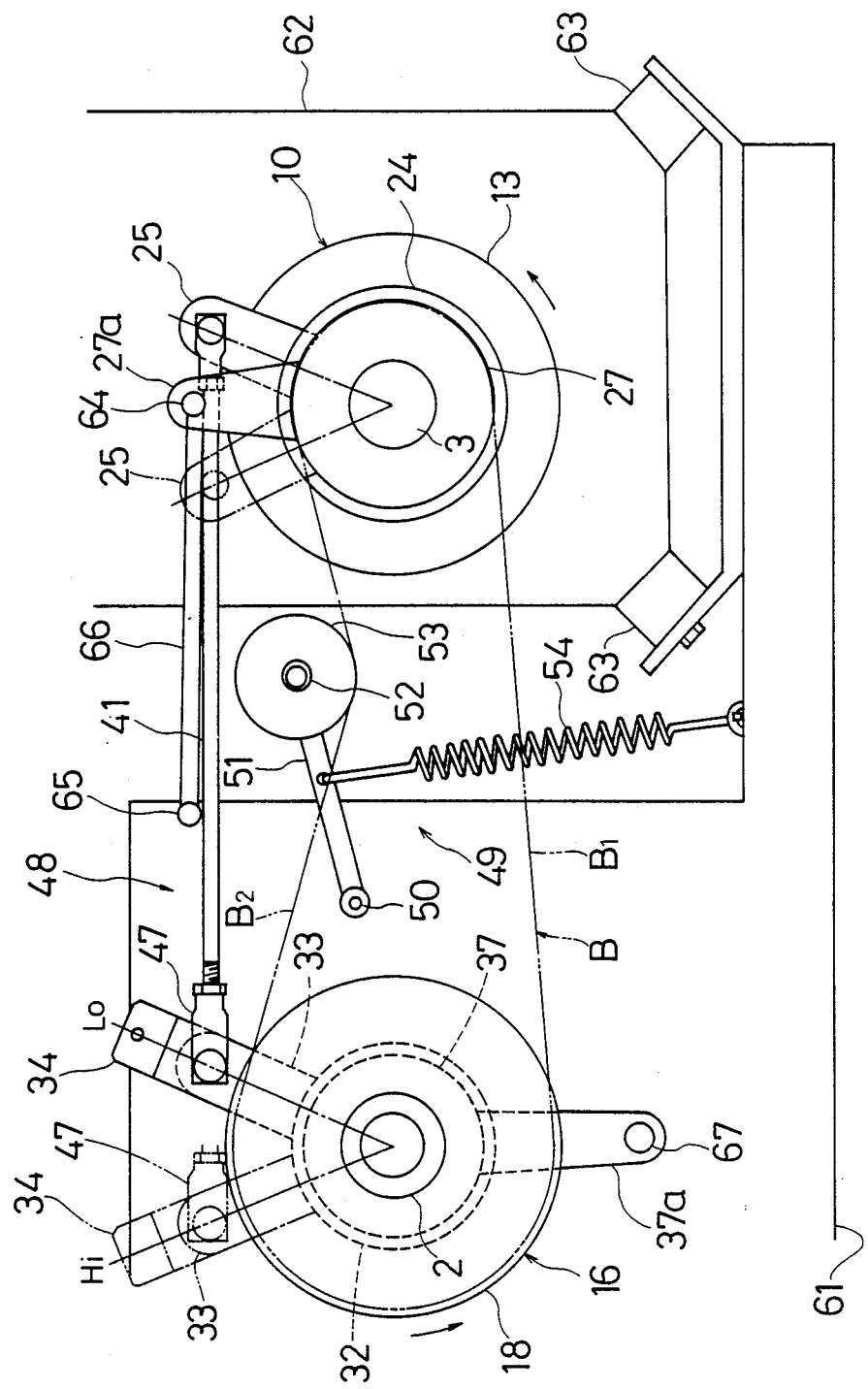
FIG. 8 is a front view of the speed-shifting device of the fifth embodiment.

FIG. 8 and FIG. 9 show the fifth embodiment. In FIG. 8, reference number 61 designates the body of a rice-planting machine. An engine 62 (in which a crank shaft corresponds to the input shaft 1) is supported by a plurality of vibration-proof rubbers 63. By these vibration-proof rubbers 63, transmission of engine vibration to the body is restricted.

In the first cam mechanism 22, the flange 27a at the outer periphery of the cam follower 27 is connected to the body 61 through the medium of pins 64, 65 and a rod 66. By this construction, the cam follower 27 is fixed non-rotatably.

In the second cam mechanism 30, a forward end of the flange 37a at the outer periphery of the cam follower 37 is connected to the body 61 through the medium of a pin 67 and the cam follower 37 is fixed non-rotatably to the body 61.

This embodiment is characterized in that the cam followers 27, 37 of the cam mechanisms 22, 30 are fixed to the body 61 which is a fixed body. By this construction, even if the engine 62 rotates at some angle round the input shaft (crank shaft) due to deformation of vibration-proof rubbers caused by load variation, the cams 24, 32 and the cam followers 27, 37 do not rotate relatively.

In this embodiment, as the engine 62 is supported to the body 61 through the medium of the vibration-proof rubbers 63, as shown in FIG. 9 the vibration-proof rubbers 63 deform due to variation of tension of the tension side span $B_1$ of the belt B at the time of load variation and the axial distance between the center $O_1$ of the crank shaft (input shaft 1) or the first rotary shaft 3 and the center $O_2$ of the output shaft 2 or the second rotary shaft 6 varies. For example, when the transmission load increases from the state shown by solid lines, an outer periphery at the underside (in the drawing) of the first pulley 10 is pulled and due to deformation of the vibration-proof rubber 63, the first rotary shaft 3 moves toward the second rotary shaft 6 as shown by virtual lines and the axial distance decreases. As the cam 24 of the first cam mechanism 22 and the cam 32 of the second cam mechanism 30 are connected by the link 41, with the above decrease in axial distance the cam 24 rotates relatively in the counterclockwise direction and the transmission ratio will be varied. However, since the cam follower 27 of the first cam mechanism 22 is connected to the body 61 by pins 64, 65 and the fixed rod 66, the cam follower 27 rotates in the same counterclockwise direction, corresponding to the cam follower 24. As a result, the cam 24 and the cam follower 27 do not rotate relatively and the opening and closing quantity of the first pulley 10 does not vary. Therefore, the transmission ratio is kept constant, irrespective of load variations, and the rice-planting machine runs stably at a fixed speed.

Since the transmission ratio does not vary at the time of load variation, no unreasonable force is applied to the link 41 connecting both cam mechanisms and deformation is prevented effectively.

The present invention is applicable to speed-shifting devices which transmit power of comparatively low load in agricultural implements, including a rice-planting machine, and other kinds of machine.

What is claimed is.

1. A pulley type speed-shifting device comprising:

a first and a second rotary shafts arranged in parallel with each other;

a first and second pulleys, each being a variable speed pulley having a fixed sheave fixedly rotatably and axially non-slidably mounted on the corresponding rotary shaft and a movable sheave axially slidably and fixedly rotatably mounted on the corresponding rotary shaft and forming a V-shaped belt groove with the corresponding fixed sheave:

a first and a second cam mechanism which vary the pulley diameter by moving the movable sheave of each pulley toward and away from the corresponding fixed sheave; and a speed-shifting mechanism which varies the transmission ratio between both rotary shafts by moving both cam mechanisms in linkage so that pulley diameters of both pulleys vary in opposite direction each other;

each of said cam mechanisms having a cylindrical cam and a cam follower carrying a rolling body which makes contact with a cam face as it is rolling, either said cylindrical cam or said cam follower being rotatable around the rotary shaft and the movable sheave being moved in axial direction by relative rotation of the cylindrical cam and the cam follower.

2. A pulley type speed-shifting device as defined in claim 1, wherein the speed-shifting mechanism has a link of straight rod-shape to connect the first and the second cam mechanisms with each other.

3. A pulley type speed-shifting device as defined in claim 1, wherein the speed-shifting mechanism is provided with a buffer means to absorb vibration transmitted between the first and the second cam mechanism.

4. A pulley type speed-shifting device as defined in claim 3, wherein the speed-shifting mechanism is composed of a link of straight rod-shape connected to a cam of one cam mechanism and a ball joint connected to a cam of the other cam mechanism and supported slidably to the link and the buffer means is a spring which is so arranged as to control a relative movement between the ball joint and the link.

5. A pulley type speed-shifting device as defined in claim 1, wherein the first rotary shaft is an output shaft of driving source supported elastically to a fixed body through the medium of an elastic member, the second rotary shaft is supported rotatably to said fixed body, a tension mechanism having a tension pulley which presses the belt slack side span when power of the first pulley is transmitted to the second pulley so as to give tension to the belt is provided between the first and the second pulleys, a cam follower of the second cam mechanism is fixed to the fixed body and a cam follower of the first cam mechanism is connected and fixed to the fixed body so that the cam and the cam follower do not rotate relatively when the power source rotates around the first rotary shaft due to deformation of the elastic member.

6. A pulley type speed-shifting device as defined in claim 1, wherein a tension mechanism having a tension pulley to give tension to the belt by pressing the belt slack side when power of the first pulley is transmitted to the second pulley and a controlling means to prevent the tension pulley from displacing more than specified in the direction opposite to the direction in which the belt is pressed are arranged.

7. A pulley type speed-shifting device as defined in claim 6, wherein the tension mechanism has a tension arm supporting a tension pulley and an urging means which is arranged between said tension arm and the fixed body and which urges the tension arm to let the tension pulley press the belt, and the controlling means is a checking member fixed to the fixed body which, when the tension arm moves more than specified in the direction opposite to the direction in which the tension pulley presses the belt, makes contact with said tension pulley and prevents the tension arm from rotating further.

8. A pulley type speed-shifting device as defined in claim 6, wherein the tension mechanism has a tension arm supporting a tension pulley and an urging means which is arranged between said tension arm and the fixed body and which urges the tension arm to let the tension pulley press the belt, and the controlling means is a flexible mechanism which is arranged between the tension arm and the fixed body in parallel with the urging means and which, when the tension arm moves more than specified in the direction opposite to the direction in which the tension pulley presses the belt, tenses and prevents the tension arm from rotating further.

9. A pulley type speed-shifting device as defined in claim 6, wherein the tension mechanism has a tension arm supporting a tension pulley and an urging means which is arranged between said tension arm and the fixed body and which urges the tension arm to let the tension pulley press the belt, and the controlling means is a damper member which is arranged between the tension arm and the fixed body in parallel with the urging means and which, when the tension arm moves more than specified in the direction opposite to the direction in which the tension pulley presses the belt, increases resistance and prevents the tension arm from rotating further.

10. A pulley type speed-shifting device as defined in claim 1, wherein a thrust generating mechanism which generates belt thrust by pressing the slack side span of the belt so that larger tension than the tension to be generated at the slack side span in response to the transmission ratio between the rotary shafts is generated is arranged between the first and the second pulleys.

11. A pulley type speed-shifting device as defined in claim 10, wherein the thrust generating mechanism presses the slack side span of the belt by tension larger than the maximum tension to be generated at said slack side span.

12. A pulley type speed-shifting device as defined in claim 10, wherein the thrust generating mechanism presses the slack side span of the belt by tension which varies with the transmission ratio between the rotary shafts.

13. A pulley type speed-shifting device as defined in claim 10, wherein the thrust generating mechanism has a roller which can press the slack side span of the belt, a roller supporting member to support said roller rotatably and an urging member to urge said roller supporting member to let the roller press the belt, said roller supporting member is provided movably so as to lower the tension of the belt and a clutch mechanism to intercept power transmission between both rotary shafts by lowering of the tension of the belt is composed.

* * * * *